US011501073B2

(12) United States Patent
Maan

(10) Patent No.: US 11,501,073 B2
(45) Date of Patent: Nov. 15, 2022

(54) METHOD, SYSTEM, AND DEVICE FOR CREATING PATENT DOCUMENT SUMMARIES

(71) Applicant: GREYB RESEARCH PRIVATE LIMITED, Chandigarh (IN)

(72) Inventor: Mahesh Maan, Mohali (IN)

(73) Assignee: GREYB RESEARCH PRIVATE LIMITED, Chandigarh (IN)

( * ) Notice: Subject to any disclaimer, the term of this patent is extended or adjusted under 35 U.S.C. 154(b) by 234 days.

(21) Appl. No.: 16/571,083

(22) Filed: Sep. 14, 2019

(65) Prior Publication Data

US 2020/0272692 A1     Aug. 27, 2020

(51) Int. Cl.
*G06F 40/295* (2020.01)
*G06F 40/30* (2020.01)
*G06Q 50/18* (2012.01)
*G06N 20/00* (2019.01)

(52) U.S. Cl.
CPC ............ *G06F 40/295* (2020.01); *G06F 40/30* (2020.01); *G06N 20/00* (2019.01); *G06Q 50/184* (2013.01)

(58) Field of Classification Search
CPC ...... G06F 40/295; G06F 40/30; G06F 16/345; G06F 40/279; G06F 40/56; G06Q 50/184; G06N 20/00
USPC ..................................... 704/9, 250, 247, 231
See application file for complete search history.

(56) References Cited

U.S. PATENT DOCUMENTS

| | | | | |
|---|---|---|---|---|
| 5,918,240 A * | 6/1999 | Kupiec | ................. | G06F 16/345 |
| | | | | 715/255 |
| 6,317,708 B1 * | 11/2001 | Witbrock | ............... | G06F 40/216 |
| | | | | 715/256 |
| 7,117,432 B1 * | 10/2006 | Shanahan | ............. | G06F 16/353 |
| | | | | 715/236 |
| 7,409,383 B1 * | 8/2008 | Tong | ................. | G06F 16/90335 |
| | | | | 707/999.102 |
| 9,009,146 B1 * | 4/2015 | Lopatenko | .......... | G06F 16/9535 |
| | | | | 707/723 |
| 9,213,687 B2 * | 12/2015 | Au | ........................ | G06F 40/237 |
| 9,767,165 B1 * | 9/2017 | Tacchi | ................ | G06F 16/9535 |
| 10,657,368 B1 * | 5/2020 | Edmund | .............. | G06V 30/418 |
| 10,812,410 B1 * | 10/2020 | Franklin | ................. | H04L 41/12 |
| 10,956,484 B1 * | 3/2021 | Kulkarni | ............... | G06F 16/783 |
| 10,990,645 B1 * | 4/2021 | Shi | .......................... | G06N 3/08 |
| 2003/0004914 A1 * | 1/2003 | McGreevy | .......... | G06F 16/3344 |

(Continued)

*Primary Examiner* — Akwasi M Sarpong
(74) *Attorney, Agent, or Firm* — Kendal Sheets

(57) ABSTRACT

A method for creating a patent document summary from a patent document text is disclosed. The method includes creating a data repository of stop-words based on analysis of a plurality of patent documents, and generating an array including a plurality of tuples from the patent document text based on the stop-words in the data repository. The method further includes identifying at least one word-sequence from the array, such that each of the at least one word-sequence occurs at least twice within the patent document text, and that each of the at least one word-sequence includes a unique last word. The method further includes replacing, for each of the at least one word-sequence, second and subsequent occurrences of each of the at least one word-sequence within the patent document text with an associated substitute word-sequence, and generating the patent document summary for the patent document text.

18 Claims, 8 Drawing Sheets

(56) References Cited

U.S. PATENT DOCUMENTS

| | | | |
|---|---|---|---|
| 2003/0061200 A1* | 3/2003 | Hubert | G06F 16/93 |
| 2006/0101014 A1* | 5/2006 | Forman | G06F 40/284 |
| 2007/0021071 A1* | 1/2007 | Brouwer | H04L 1/0001 |
| | | | 455/69 |
| 2009/0177963 A1* | 7/2009 | Proctor | G06F 16/345 |
| | | | 715/254 |
| 2011/0106807 A1* | 5/2011 | Srihari | G06F 16/288 |
| | | | 707/E17.046 |
| 2011/0295857 A1* | 12/2011 | Aw | G06F 40/45 |
| | | | 707/739 |
| 2012/0166180 A1* | 6/2012 | Au | G06F 40/237 |
| | | | 704/9 |
| 2012/0254333 A1* | 10/2012 | Chandramouli | G06F 40/10 |
| | | | 709/206 |
| 2012/0265765 A1* | 10/2012 | Tveit | G06F 16/322 |
| | | | 707/747 |
| 2013/0013612 A1* | 1/2013 | Fittges | G06F 16/353 |
| | | | 707/739 |
| 2015/0033120 A1* | 1/2015 | Cooke | G06F 40/194 |
| | | | 715/256 |
| 2015/0339288 A1* | 11/2015 | Baker | G06F 40/166 |
| | | | 704/9 |
| 2016/0019293 A1* | 1/2016 | Bhagwat | G06F 16/24578 |
| | | | 707/732 |
| 2016/0110428 A1* | 4/2016 | Vasenkov | G06F 16/367 |
| | | | 707/803 |
| 2016/0224804 A1* | 8/2016 | Carasso | G06F 16/2322 |
| 2017/0075877 A1* | 3/2017 | Lepeltier | G06F 40/117 |
| 2017/0270409 A1* | 9/2017 | Trischler | G06F 40/30 |
| 2017/0286914 A1* | 10/2017 | Fang | G06N 20/00 |
| 2017/0351663 A1* | 12/2017 | Sordoni | G06F 40/30 |
| 2018/0270277 A1* | 9/2018 | Blanchard | H04L 12/1822 |
| 2018/0336183 A1* | 11/2018 | Lee | G06N 3/08 |
| 2019/0213407 A1* | 7/2019 | Toivanen | G06F 40/30 |
| 2019/0349321 A1* | 11/2019 | Cai | G06F 40/237 |
| 2020/0160231 A1* | 5/2020 | Asthana | G06F 16/9024 |

* cited by examiner

METHOD, SYSTEM, AND DEVICE FOR CREATING PATENT DOCUMENT SUMMARIES

CROSS-REFERENCE TO RELATED APPLICATIONS

This application claims priority benefits under 35 U.S.C. § 119(b) to Indian Application No. 201911007538, filed on Feb. 26, 2019, which is hereby incorporated by reference in its entirety.

TECHNICAL FIELD

This disclosure relates generally to patent documents, and more particularly to method, system, and device for creating patent document summaries.

BACKGROUND

A patent document is a techno-legal document that describes an invention using a combination of technical language and legalese. Thus, a patent document text may include multiple technical terms/phrases and legal terms. Moreover, in order to meet legal compliance for a patent document at a patent office, there is a significant amount of repetition of words in the patent document, which may not be used in normal parlance. The text in a patent document may also include lengthy word-sequences that may be difficult to comprehend and retain by a patent reviewer for further analysis. These lengthy word-sequences may also increase the length of patent text in the patent document. Additionally, text in a patent document may be unorganized and/or inconsistent with respect to the terminology used. For example, a patent document may include a concept, which may be described at different locations within the patent document using different terminologies.

A patent document may be analyzed with the objective of extracting one or more inventive aspects from the patent document. However, as a result of at least the above reasons, analyzing a patent document is a laborious, stressful, and time consuming task. Moreover, for a lengthy patent document, the number of hours required for analysis may increase considerably. This may have an impact on the quality and correctness of the analysis performed for a patent document, thereby affecting various patent analytics services.

SUMMARY

In one embodiment, a method for creating a patent document summary from a patent document text is disclosed. In one embodiment, the method may include creating a data repository of stop-words based on analysis of a plurality of patent documents by a machine learning algorithm. The method may further include generating an array comprising a plurality of tuples from the patent document text based on the stop-words in the data repository, such that the plurality of tuples may be identified by removing one or more stop-words in the data repository from the patent document text. The method may further include identifying at least one word-sequence from the array, such that each of the at least one word-sequence occurs at least twice within the patent document text. Further, each of the at least one word-sequence may comprise a unique last word. The method may further include replacing, for each of the at least one word-sequence, second and subsequent occurrences of each of the at least one word-sequence within the patent document text with an associated substitute word-sequence, such that the associated substitute word-sequence comprises at least one word. The method may further include generating, the patent document summary for the patent document text in response to the replacing.

In another embodiment, a system for creating a patent document summary from a patent document text is disclosed. The system includes a processor and a memory communicatively coupled to the processor, wherein the memory stores processor instructions, which, on execution, causes the processor to create a data repository of stop-words based on analysis of a plurality of patent documents by a machine learning algorithm. The processor instructions further cause the processor to generate an array comprising a plurality of tuples from the patent document text based on the stop-words in the data repository, such that the plurality of tuples are identified by removing one or more stop-words in the data repository from the patent document text. The processor instructions further cause the processor to identify at least one word-sequence from the array, such that each of the at least one word-sequence occurs at least twice within the patent document text. Each of the at least one word-sequence may comprise a unique last word. The processor instructions further cause the processor to replace, for each of the at least one word-sequence, second and subsequent occurrences of each of the at least one word-sequence within the patent document text with an associated substitute word-sequence, such that the associated substitute word-sequence comprises at least one word. The processor instructions further cause the processor to generate the patent document summary for the patent document text in response to the replacing.

In yet another embodiment, a non-transitory computer-readable storage medium is disclosed. The non-transitory computer-readable storage medium has instructions stored thereon, a set of computer-executable instructions causing a computer comprising one or more processors to perform steps comprising creating a data repository of stop-words based on analysis of a plurality of patent documents by a machine learning algorithm; generating an array comprising a plurality of tuples from the patent document text based on the stop-words in the data repository, such that the plurality of tuples are identified by removing one or more stop-words in the data repository from the patent document text; identifying at least one word-sequence from the array, such that each of the at least one word-sequence occurs at least twice within the patent document text, and such that each of the at least one word-sequence comprises a unique last word; replacing, for each of the at least one word-sequence, second and subsequent occurrences of each of the at least one word-sequence within the patent document text with an associated substitute word-sequence, such that the associated substitute word-sequence comprises at least one word; and generating the patent document summary for the patent document text in response to the replacing.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
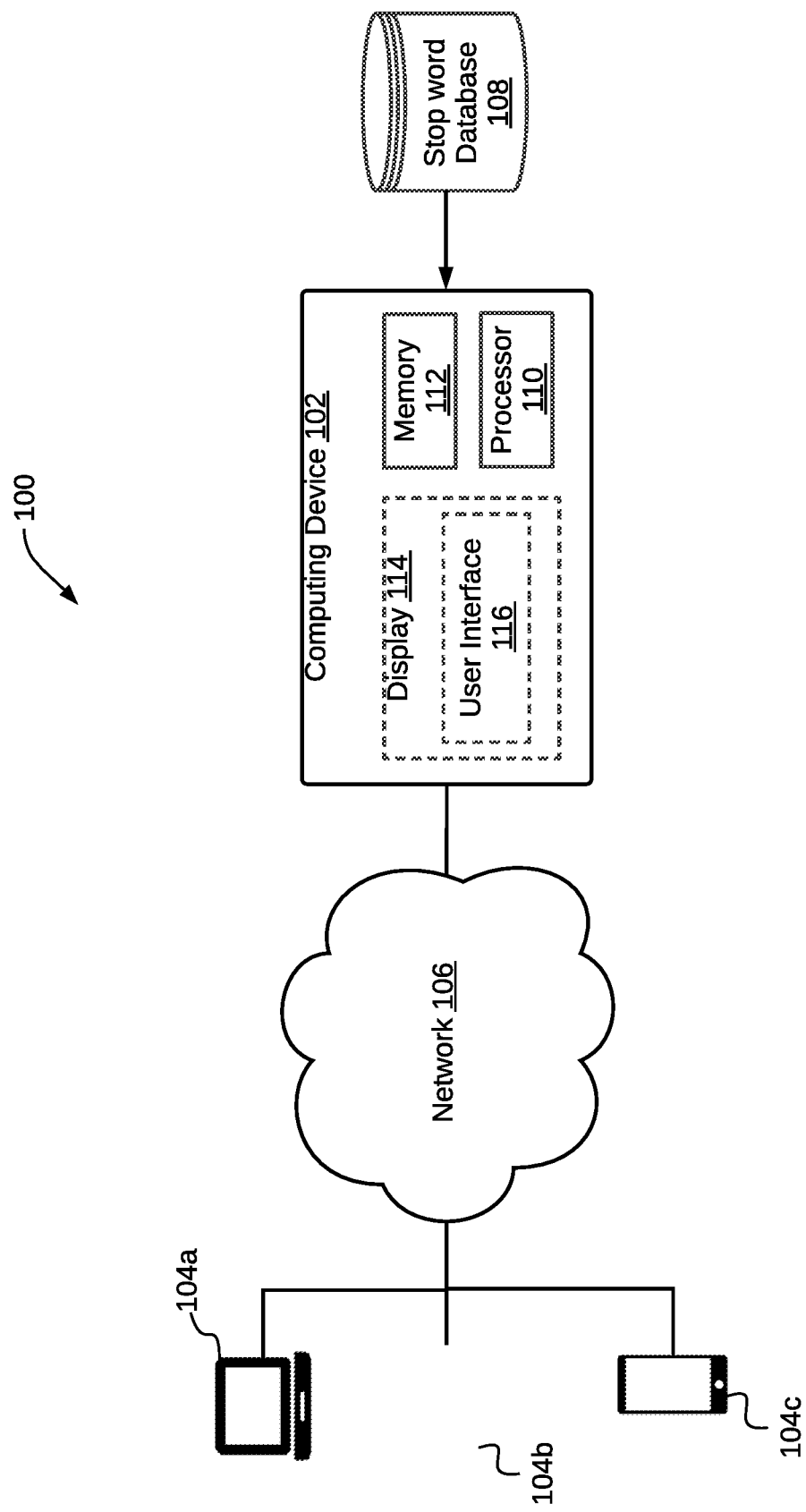
FIG. 1 is a block diagram illustrating a system for creating a patent document summary from a patent document text, in accordance with an embodiment.

In one embodiment, a system 100 for creating a patent document summary from a patent document text is illustrated in the FIG. 1, in accordance with an embodiment. The system 100 may include a computing device 102 that has processing capability to create a patent document summary from a patent document text. Examples of the computing device 102 may include, but are not limited to, a server, a desktop, a laptop, a notebook, a netbook, a tablet, a smartphone, a mobile phone, an application server, or the like.

The patent document text may be received by the computing device 102 from input devices 104a, 104b, 104c (collectively referred to as input devices 104). Examples of the input devices 104 may include, but are not limited to a desktop, a laptop, a notebook, a netbook, a tablet, a smartphone, a remote server, a mobile phone, or another computing system/device. The input devices 104 are communicatively coupled to the computing device 102, via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

As will be described in greater detail in conjunction with FIG. 2 to FIG. 6, in order to create a patent document summary from a patent document text, the computing device 102 may generate an array that includes a plurality of tuples from the patent document text based on stop-words in a data repository, for example, a stop word database 108 coupled to the computing device 102. The stop word database 108 may include a repository of stop words that may be created manually. Alternatively, or additionally, the repository of stop words may be updated periodically, for example, by way of machine learning.

The computing device 102 may further identify one or more word-sequences from the array. For each of the one or more word-sequences, the computing device 102 may replace second and subsequent occurrences of each of the one or more word-sequences within the patent document text with an associated substitute word-sequence. Thereafter, in response to the replacing, the computing device 102 may generate the patent document summary for the patent document text.

In order to perform the above discussed functionalities, the computing device 102 may include a processor 110 and a memory 112. The memory 112 may store instructions that, when executed by the processor 110, cause the processor 110 to create a patent document summary from a patent document text, as discussed in greater detail in FIG. 2 to FIG. 6. The memory 112 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited to Dynamic Random Access Memory (DRAM), and Static Random-Access memory (SRAM). The memory 112 may also store various data (e.g., patent document text data, patent document summary data, stop word data, machine learning data, tuples data, highlighting attribute data, predefined action data, substitute word-sequence data, feedback data, or mapping dictionary data, etc.) that may be captured, processed, and/or required by the system 100.

The computing device 102 may include a display 114 that further includes a user interface 116. A user or administrator may interact with the computing device 102 and vice versa through the display 114. By way of an example, the display 114 may be used to display results of analysis performed by the computing device 102, to the user. By way of another example, the user interface 116 may be used by the user to provide inputs to the computing device 102.

Figure 2:
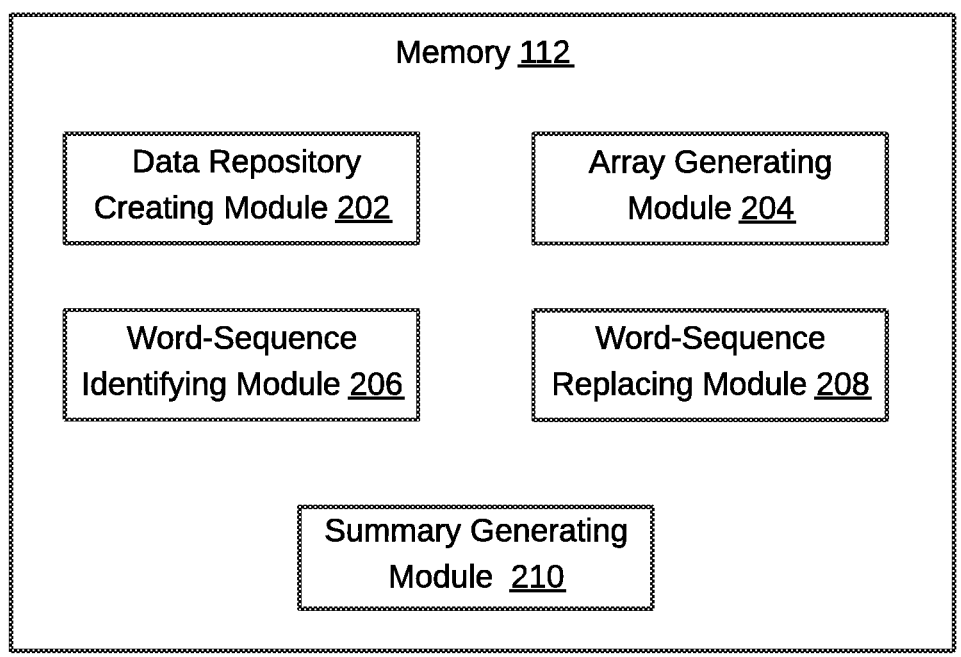
FIG. 2 illustrates a block diagram of a memory of a computing device for creating a patent document summary from a patent document text, in accordance with an embodiment.

Referring now to FIG. 2, a functional block diagram of the memory 112 within the computing device 102 configured to create a patent document summary from a patent document text is illustrated, in accordance with an embodiment. The memory 112 may include modules that may perform various functions so as to create a patent document summary from a patent document text. The memory 112 may include a data repository creating module 202, an array generating module 204, a word-sequence identifying module 206, a word-sequence replacing module 208, and a summary generating module 210. As will be appreciated by those skilled in the art, all such aforementioned modules 202-210 may be represented as a single module or a combination of different modules. Moreover, as will be appreciated by those skilled in the art, each of the modules 202-210 may reside, in whole or in parts, on one device or multiple devices in communication with each other.

The data repository creating module 202 may receive a plurality of patent documents from one or more of the input devices 104. Alternatively, or additionally, the plurality of patent documents may be directly provided to the computing device 102, via the user interface 116, which may then be received by the data repository creating module 202. The data repository creating module 202 may then create a data repository of stop-words based on analysis of the plurality of patent documents. Alternatively, or additionally, a list of stop words may be provided to the data repository creating module 202 by an administrator through the user interface 116 or a user through one or more of the input devices 104. The list of stop word may be prepared manually.

In some embodiments, the data repository creating module 202 may employ machine learning techniques to analyze the plurality of patent documents in order to extract stop words. The plurality of patent documents may act as collection of multiple data points which may be utilized to train and develop a machine learning model. Based on the machine learning model, the data repository creating module 202 may identify stop words in the plurality of patent documents to create the data repository of stop words. As may be appreciated, the machine learning model may keep updating itself with each new patent document that may be received by the data repository creating module 202. As will be appreciated by those skilled in the art, the stop words may include common words in a language. By way of an example, a non-exclusive list of stop words may include:

"a", "about", "above", "accompanying", "accomplish", "accomplished", "accomplishes", "accomplishing", "accordance", "according", "accordingly", "achieve", "achieved", "achievement", "achieves", "achieving", "additionally", "advantage", "advantageous", "advantageously", "advantages", "after", "all", "along", "also", "although", "among", "an", "and", "and/or", "any", "are", "art", "as", "aspect", "aspects", "assume", "assumed", "assumes", "assuming", "assumption", "assumptions", "at", "basis", "be", "because", "been", "being", "below", "between", "but", "by", "can", "cause", "caused", "causes", "causing", "certain", "comprise", "comprised", "comprises", "comprising", "could", "currently", "describe", "described", "describes", "description", "desired", "detail", "detailed", "detailing", "details", "disclose", "disclosed", "discloses", "disclosing", "discuss", "discussed", "discussion", "do", "does", "e.g", "either", "embodied", "embodiment", "embodiments", "embody", "etc", "example", "exemplary", "fig", "figure", "figures", "first", "for", "from", "function", "functionality", "functioning", "functions", "further", "general", "given", "has", "have", "having", "hereafter", "herein", "hereinafter", "how", "however", "i.e", "if", "illustrate", "illustrated", "illustrates", "illustration", "implement", "implementation", "implemented", "implementing", "implements", "in", "include", "included", "includes", "including", "information", "input", "into", "invent", "invented", "invention", "inventions", "inventors", "invents", "is", "it", "its", "known", "made", "main", "make", "makes", "making", "manner", "may", "means", "method", "methods", "might", "must", "noted", "occur", "occurred", "occurring", "occurs", "of", "on", "one", "or", "ought", "over", "particular", "perhaps", "plural", "plurality", "possible", "possibly", "present", "presently", "prior", "provide", "provided", "provides", "providing", "purpose", "purposed", "purposes", "regard", "relate", "related", "relates", "relating", "said", "should", "shown", "similar", "since", "skill", "skilled", "so", "some", "step", "steps", "such", "suitable", "taught", "teach", "teaches", "teaching", "that", "the", "their", "them", "then", "there", "thereafter", "thereby", "therefore", "therefrom", "therein", "thereof", "thereon", "these", "they", "third", "this", "those", "though", "through", "thus", "to", "under", "until", "upon", "use", "used", "uses", "using", "utilizes", "various", "very", "was", "we", "well", "when", "where", "whereby", "wherein", "whether", "which", "while", "will", "with", "within", "would", "yet"

When the patent document text that is to be summarized is provided, based on the stop words in the data repository, the array generating module 204 may generate an array that includes a plurality of tuples from the patent document text. It may be appreciated by those skilled in the art that the tuples are a finite ordered sequence of elements, such as words. In some embodiments, the plurality of tuples may be identified by removing one or more stop words in the data repository from the patent document text. In some embodiments, the patent document text may be converted into an array of tuples by removing all continuous strings of patent-specific stop-words from the text. Examples of patent-specific stop words may include, but are not limited to wherein, invention, embodiment, inventors, or illustrate.

Once the array is generated, the word-sequence identifying module 206 may identify one or more word-sequences from the array, such that, each of the one or more word-sequences occurs at least twice within the patent document text. In other words, the word-sequence identifying module 206 may identify one or more word-sequences which occur more than once within the patent document text. Additionally, each of the one or more word-sequences includes a unique last word. In other words, none of the one or more word-sequences include the same last word.

Once the one or more word-sequences are identified, the word-sequence replacing module 208 may replace each of the identified one or more word-sequences with an associated substitute word-sequence. In some embodiments, the associated substitute word-sequence may be determined based on a mapping dictionary, for replacing the identified one or more word-sequences. The mapping dictionary may be updated periodically. In some embodiments, the word-sequence replacing module 208 may replace a second and subsequent occurrences of each of the one or more word-sequences within the patent document text with an associated substitute word-sequence. In other words, except for the first occurrence of a word-sequence, the word-sequence replacing module 208 may replace every repetition of the word-sequence within the patent document text with an associated substitute word-sequence.

The associated substitute word-sequence that is used to replace an identified word-sequence may include one or more words. By way of an example, the associated substitute word-sequence used to replace an identified word-sequence may be the last word of the identified word-sequence. For example, the word-sequence replacing module 208 may replace identified word-sequences, such as "electronic message," "electrically powered vehicle," "power source," "charging process," and "charging device," with associated substitute word-sequences "message," "vehicle," "source," "process," and "device," respectively.

In response to the replacing, the summary generating module 210 may generate a patent document summary for the patent document text. As a result of replacing one or more occurrences of word-sequences with relatively shorter word-sequences, the patent document summary may be concise and shorter when compared with the original patent document text.

The generated patent document summary may be displayed to a user through the display 114 of the computing device 102. Further, the display 114 may display each substitute word-sequence in the patent document summary with a highlighting attribute to indicate text replacement. In other words, a substitute word-sequence is highlighted to indicate that the substitute word-sequence is not the original text from the patent document. The highlighting attribute may include, but is not limited to one or more of underline, italics, bold, color, or strikethrough. By way of an example, a text replacement, i.e., a substitute word-sequence replacing the original text, may be indicated by changing the font color or the background-color of the substitute word-sequence.

Figure 3:
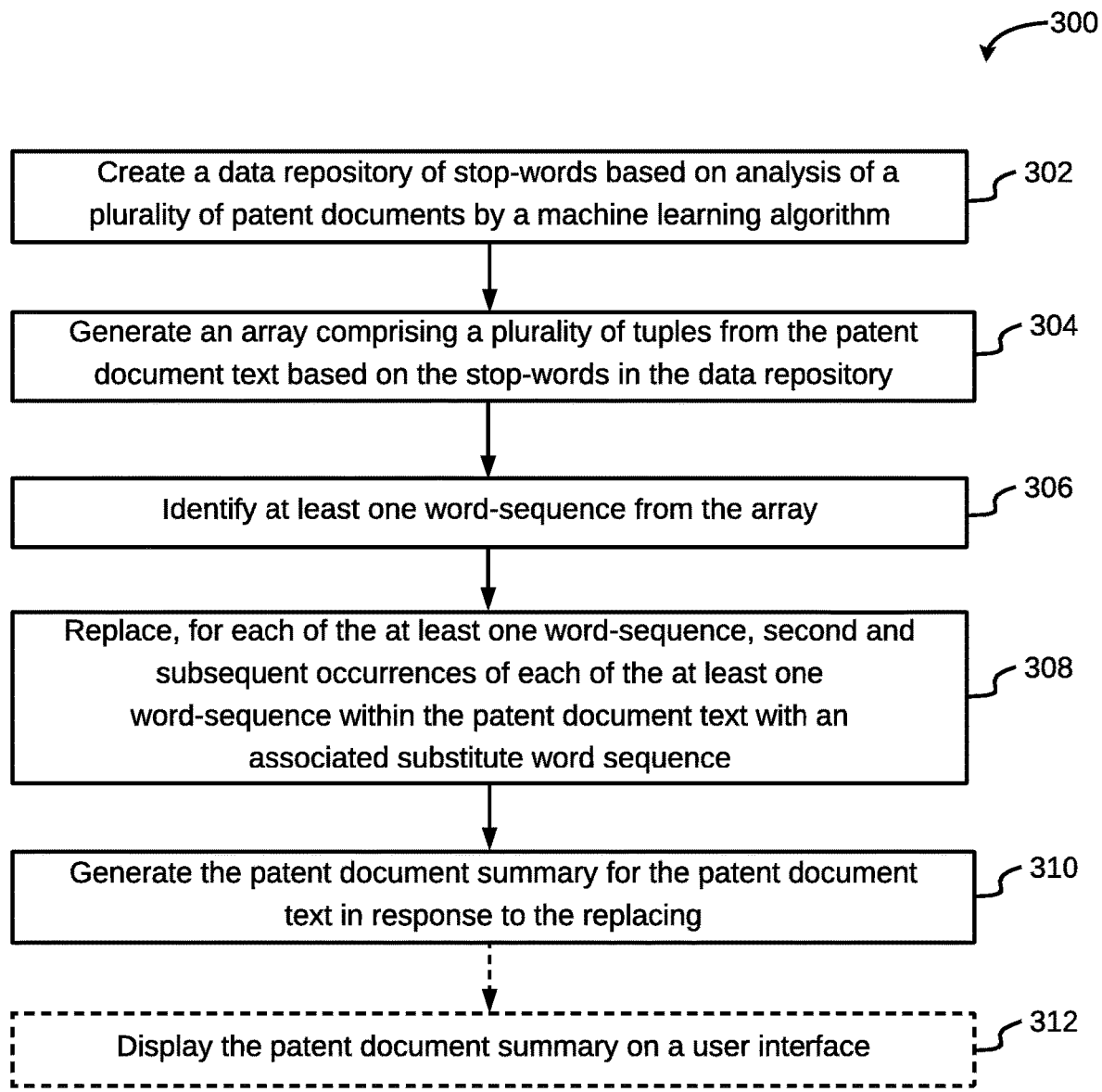
FIG. 3 illustrates a flowchart of a method for creating a patent document summary from a patent document text, in accordance with an embodiment.

Referring now to FIG. 3, a flowchart 300 of a method for creating a patent document summary from a patent document text is illustrated, in accordance with an embodiment. In some embodiments, the patent document summary may be created from the patent document text by the computing device 102.

At step 302, a data repository of stop-words may be created based on analysis of a plurality of patent documents. In some embodiments, the data repository of the stop-words may be created by the data repository creating module 202 within the computing device 102. Further, in some embodiments, the data repository of the stop-words may be created based on analysis of the plurality of patent documents by machine learning. This has already been explained in detail in conjunction with FIG. 2.

At step 304, an array that includes a plurality of tuples may be generated from the patent document text. In some embodiments, the array may be generated by the array generating module 204 of the computing device 102. The plurality of tuples may be identified by removing one or more stop-words in the data repository from the patent document text. In some embodiments, the patent document text may be converted into an array of non-generic tuples. By way of an example, for converting the patent document text into an array of non-generic tuples, all patent-specific stop-words may be removed from the patent document text. The generating of an array comprising a plurality of tuples is further explained in detail in conjunction with FIG. 5.

At step 306, one or more word-sequences may be identified from the array, such that each of the one or more word-sequences occurs at least twice within the patent document text. In other words, one or more word-sequences may be identified which occur more than once within the patent document text. Additionally, each of the at least one word-sequences includes a unique last word. In other words, none of the one or more word-sequences include the same last word. In some embodiments, the one or more word-sequences may be identified from the array by a word-sequence identifying module 206 of the computing device 102.

Once the one or more word-sequences are identified, at step 308, a second and subsequent occurrences of each of the one or more word-sequences within the patent document text may be replaced with an associated substitute word-sequence. In other words, once one or more word-sequences are identified, except for the first occurrence of a word-sequence, each repetition of the word-sequence is replaced with an associated substitute word-sequence having at least one word.

At step 310, in response to the replacing, a patent document summary may be generated for the patent document text. It may be appreciated that owing to replacing of repetitions of word-sequences with relatively shorter word-sequences, the patent document summary may be concise and shorter when compared with the original patent document text. At step 312, the generated patent document summary may be displayed on the display 114 of the computing device 102. In some embodiments, each substitute word-sequence in the patent document summary may include a highlighting attribute to indicate text replacement. In other words, the substitute word-sequence is highlighted to indicate that the substitute word-sequence is not the original text from the patent document. The highlighting attribute may include at least one of underline, italics, bold, color, or strikethrough. The displaying of the patent document summary on the display 114 is further explained in detail in conjunction with FIG. 4.

Figure 4:
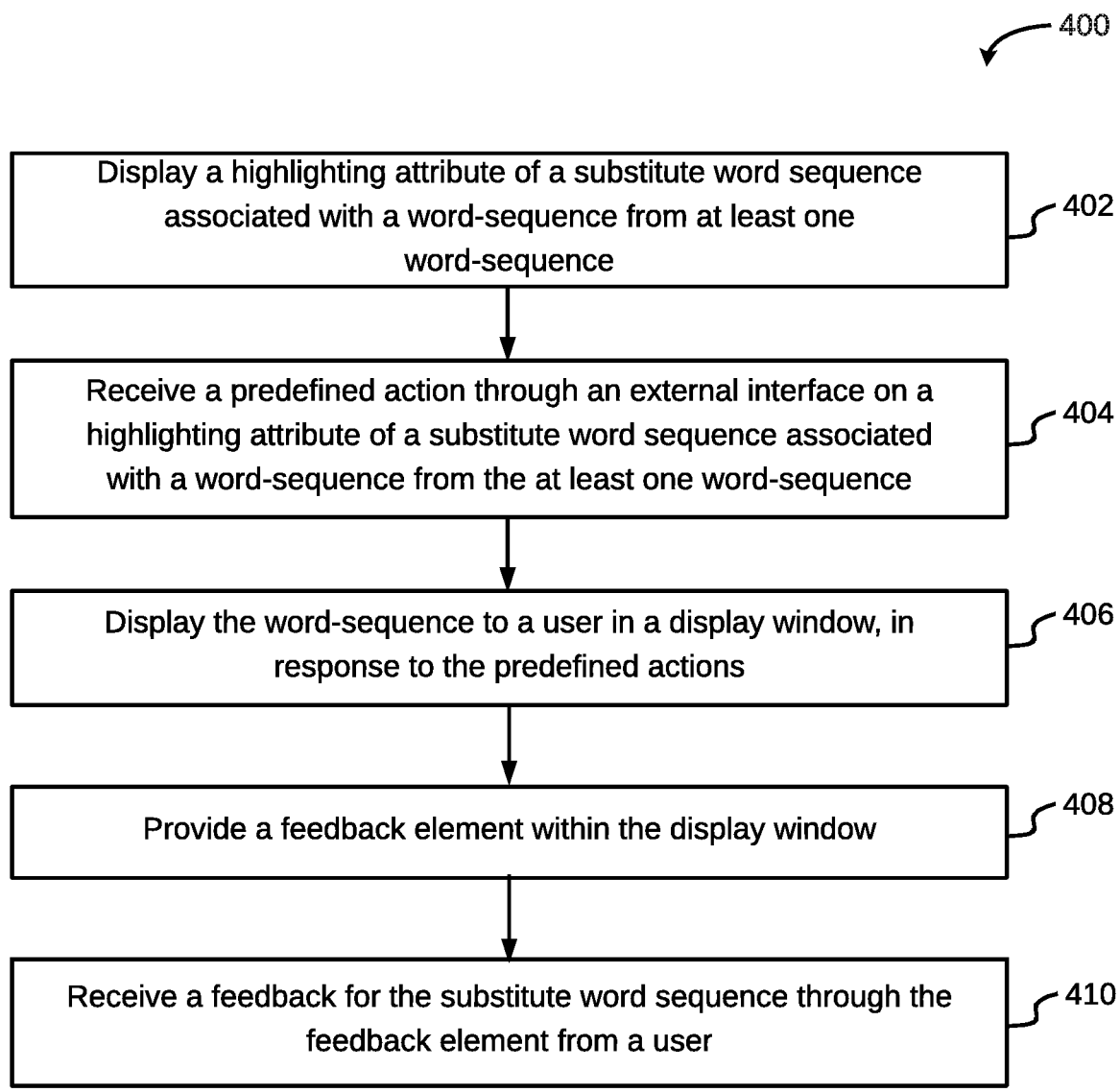
FIG. 4 illustrates a plurality of text boxes including exemplary text at different stages of creating a patent document summary from a patent document text, in accordance with an embodiment.

Referring now to FIG. 4, a flowchart 400 of a method for displaying patent document summary associated with a patent document text is illustrated, in accordance with an embodiment. At step 402, a highlighting attribute of a substitute word-sequence associated with a word-sequence from one or more word-sequences may be displayed. The highlighting attribute may be displayed so as to indicate to the user that the substitute word-sequence that has the highlighting attribute is not the original word-sequence of the patent document text, but is replaced text. Examples of the highlighting attribute may include, but are not limited to underline, italics, bold, color, or strikethrough. By way of an example, the text replacement may be indicated by highlighting the replaced text by changing the font color, or changing the background-color of the replaced text.

At step 404, a predefined action may be received through an external interface on a highlighting attribute of a substitute word-sequence. By way of an example, the external interface may include a mouse, a touch screen, or a keyboard. By way of an example, the predefined action may include at least one of clicking on the highlighting attribute, hovering a mouse pointer over the highlighting attribute, clicking on the highlighting attribute for a predefined duration through a mouse, or performing a right-click on the highlighting attribute.

At step 406, in response to the predefined action, the original word-sequence may be displayed to a user in a display window. In some embodiments, the original word-sequence may be displayed to the user via the display 114 of the computing device 102. By way of an example, when the user hovers a mouse cursor over the highlighting attribute of the substitute word-sequence, the original text may be displayed in a hover box over the substitute word-sequence.

In addition to the original word-sequence, a feedback element may be provided within the display window at step 408. The feedback element may allow a user to provide a feedback with regards to approval or disapproval for the substitute word-sequence used to replace the original word-sequence. The feedback element, for example, may be a rating scale, which may be presented in the form of a slider or selectable button elements, such that, user selection of a particular rating indicates the user's acceptability of the substitute word-sequence in place of the original word-sequence.

A feedback provided by a user for the substitute word-sequence may be received through the feedback element at step 408. As discussed above, the feedback may either include approval for the substitute word-sequence or disapproval for the substitute word-sequence. When the feedback is disapproval for the substitute word-sequence, the feedback may also include alternative word-sequence suggestion in place of the substitute word-sequence. To this end, a text element may be provided within the feedback element, which may be used by the user to provide the alternative word-sequence suggestion. In an embodiment, a drop-down menu may be provided that may include a list of alternative word-sequence suggestion and the user may select the most appropriate one from the list. Thus, by way of the feedback, a user may either approve or disprove of the substitute word-sequence selected by the computing device 102. Additionally, when the user does not approve of the substitute word-sequence selected by the computing device 102, the user may suggest an alternative word-sequence through the feedback.

Based on the feedback, the mapping dictionary may be updated periodically. By way of an example, alternative word-sequence suggested by the user may be used for replacing earlier mapping in the mapping dictionary. In some embodiments, the mapping dictionary may be updated based on machine learning techniques through incremental learning. Further, multiple different mapping dictionaries may be applied to different patent text documents depending upon the context and technology area associated with the patent document. By way of an example, for a chemical patent, all the occurrences of a word-sequence, such as "ozone" in the patent document text may be replaced with "O3", as a reviewer, being from a chemical technology background, would be familiar with the replaced term. However, in a patent from the field of electrical engineering, the word-sequence "ozone" may be used in a line which states that: "ozone is generated during corona discharge." In this case, if "ozone" is replaced with "O3," the reviewer might not be aware of the term "O3." Thus, in a non-chemical context the "ozone" may not be replaced with the substitute word-sequence, i.e., "O3." In an embodiment, mapping dictionaries may be created based on the main International Patent Classifications (IPC) classes.

Figure 5A:
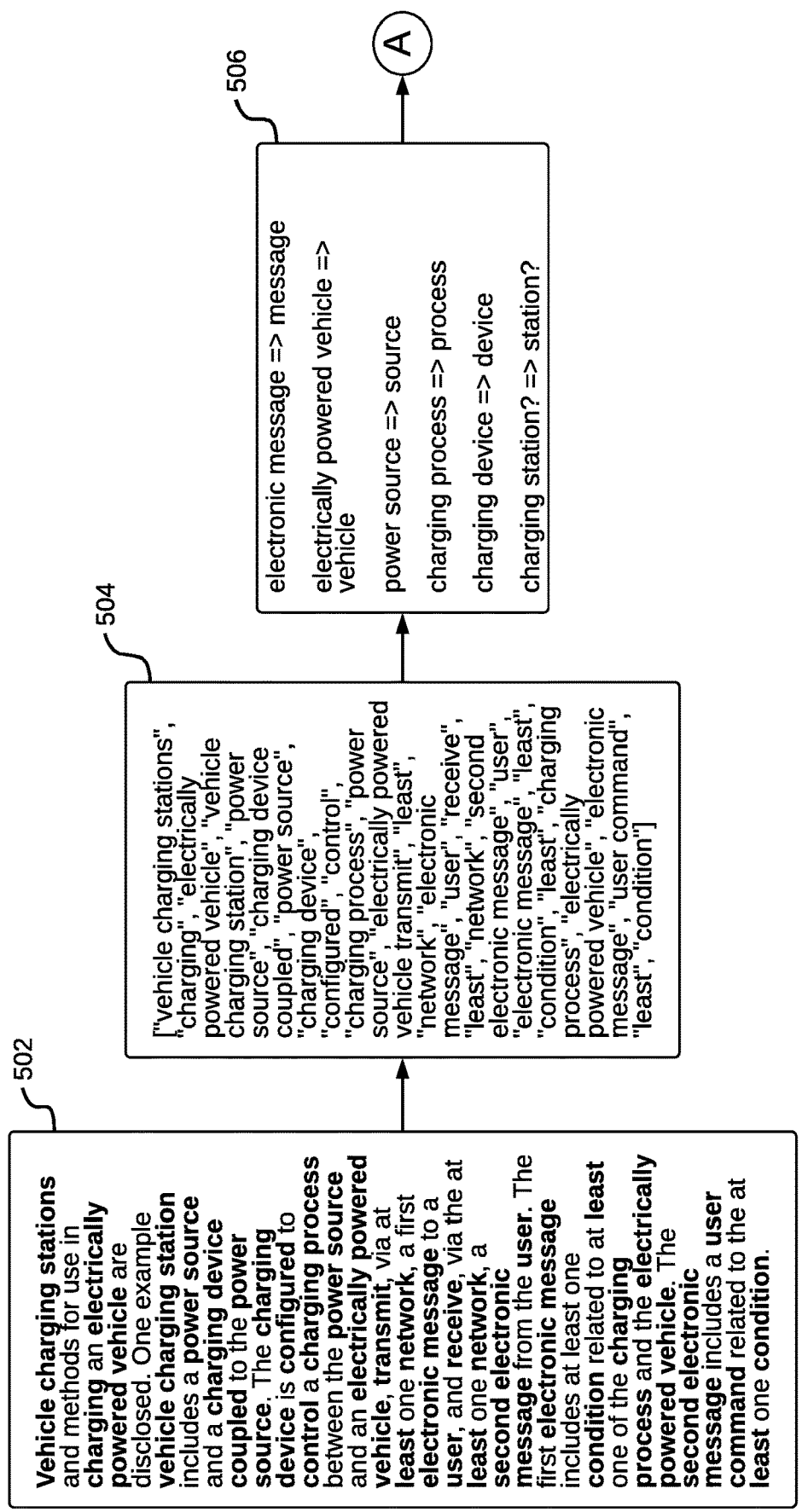
FIGS. 5A and 5B illustrates a flowchart of a method for displaying the patent document summary on a user interface, in accordance with an embodiment.
Figure 5B:
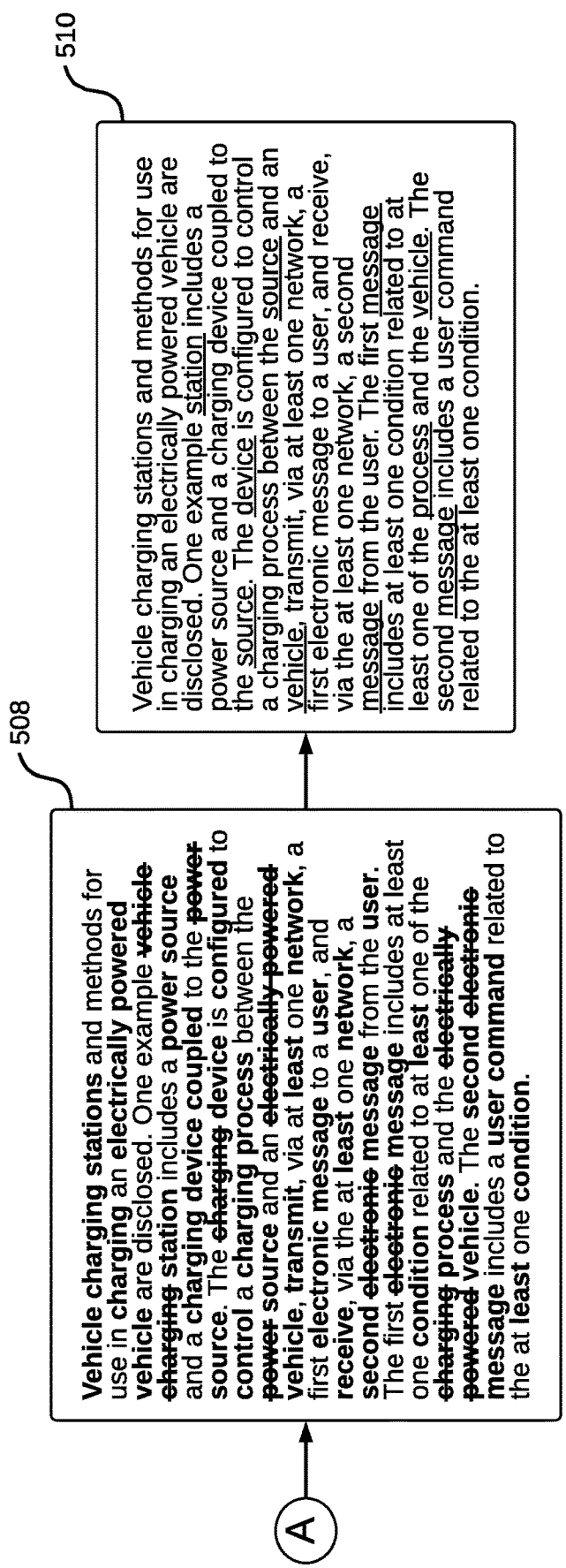

Referring now to FIGS. 5A and 5B, an exemplary process of creating a patent document summary from a patent document text is illustrated, in accordance with some embodiments. A text box 502 illustrates an input patent document text received by the computing device 102 for creating a patent document summary. As will be appreciated, the input patent document text may include a plurality of stop words. By way of an example, the stop words may include "and", "methods", "for" and "use". Once the input patent document text has been received, a plurality of tuples may be identified from the input patent document text by removing one or more stop-words. The plurality of tuples are highlighted within the text box 502 and some of the plurality of tuples may include "vehicle charging stations", "electronic message", and "electrically powered vehicle." The stop words, for example, may be removed based on a data repository of stop words. This has been explained in detail in conjunction with FIG. 3 and FIG. 4.

A text box 504 illustrates an array that includes the plurality of tuples that were identified from the input patent document text. As shown in the FIG. 5A, the array may include tuples, such as "vehicle charging station", "charging", "electrically powered vehicle", and so on. From the array, one or more word-sequences may be identified, such that, each of the one or more word-sequences occurs at least twice within the patent document text. Additionally, each of the one or more word-sequence include a unique last word. As a result, the following word-sequences, for example, are identified from within the array in the text box 504: "electronic message", "electrically powered vehicle", "power source." Each of these word-sequences have been used at least twice in the text (even as part of other elements) and last words for each of these word-sequences do not appear as the last word of any other word-sequence.

For each of the identified one or more word-sequences within the patent document text, a text box 506 shows a substitute word-sequence that would be used to replace an associated original word-sequence in the input patent document text. It may be noted that a second and subsequent occurrences for each of the one or more identified word-sequences within the patent document text is replaced with an associated substitute word-sequence. By way of an example, as shown in the text box 506, the identified word-sequence "electronic message" would be replaced with an associated substitute word-sequence "message," "electrically powered vehicle" would be replaced with "vehicle," and "power source" is replaced with "source". Further, it may be noted that plural forms, such as, "station" and "stations" may be considered as equivalent word-sequence. As a result, both the word-sequences "charging station" and "charging stations" may be replaced with the word-sequence "station."

A text box 508 in the FIG. 5B illustrates the patent document text, such that, the identified one or more word-sequences have been replaced with associated substitute word-sequences. For ease of representation, each of the one or more identified word-sequences are represented by way of bold font, and the replaced word-sequences are represented by way of strike-through. It may be noted that except for the first occurrence of each of the identified one or more word-sequences, the subsequent occurrences are replaced with the associated substitute word-sequences. The text box 508 is however not presented to an end-user as the patent document summary.

The patent document summary is presented in a text box 510 depicted in the FIG. 5B. In the text box 510, the identified one or more word-sequences with strike-through are removed and associated substitute word-sequences are retained and are highlighted by way of underline. For example, the word-sequence "source" that is used to replace the identified word-sequence "power source" is underlined.

Figure 6:
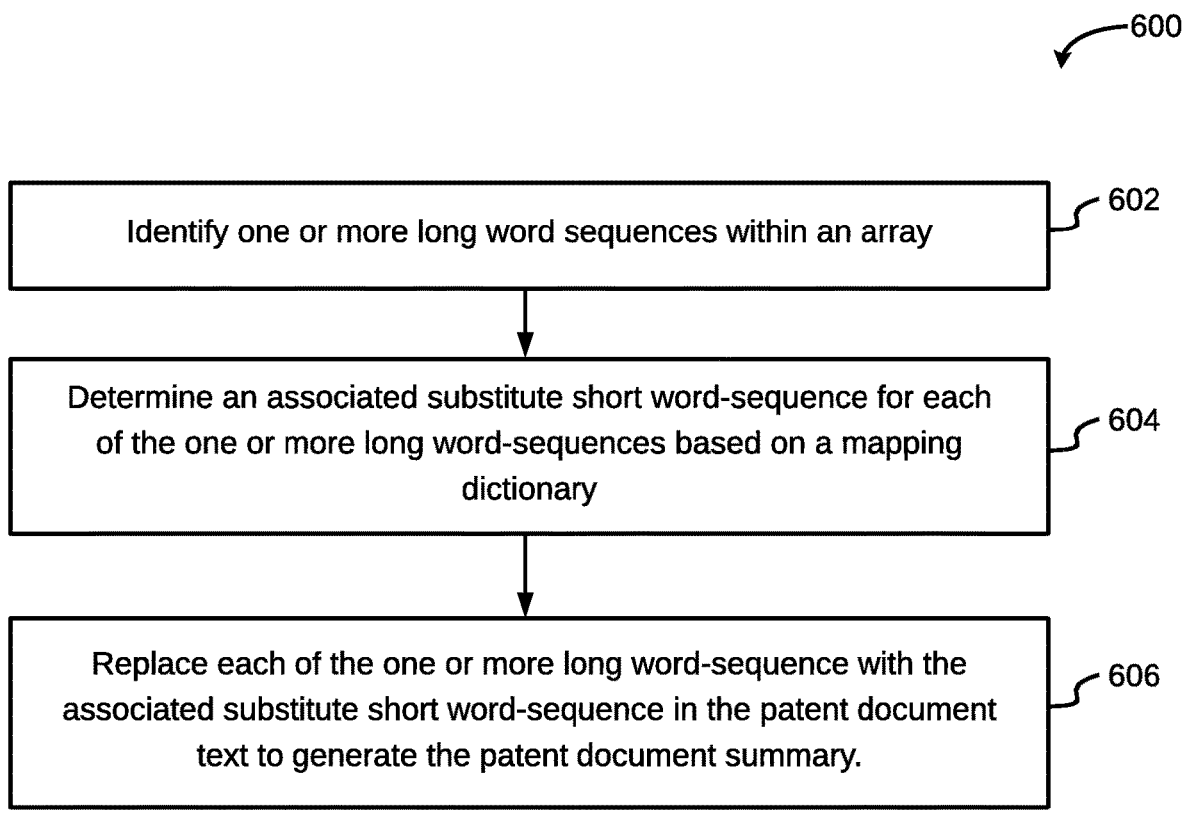
FIG. 6 illustrates a flowchart of a method for creating a patent document summary from a patent document text, in accordance with another embodiment.

Referring now to FIG. 6, a flowchart 600 of another method for creating a patent document summary from a patent document text is illustrated, in accordance with some embodiments. At step 602, one or more long word-sequences may be identified within a patent document text or an array of word-sequences. By way of an example, one or more long word-sequences may include "charging unit", "charging station", "charging device", "charging apparatus", "charging equipment", and "charging module" may be identified.

At step 604, an associated substitute short word-sequence may be determined for each of the one or more long word-sequences based on a mapping dictionary. By way of an example, for the long word-sequences, such as "charging unit", "charging station", "charging device", "charging apparatus", "charging equipment", and "charging module" an associated substitute short word "charger" is determined based on a mapping dictionary. It may be appreciated that the mapping dictionary may be any dictionary known in the art. Further, in some embodiments, the mapping dictionary may be stored in the memory 112 of the computing device 102. It may be noted that plural version of the one or more long word-sequences may also be taken into account along with the singular version of each of the one or more long word-sequences. For the plural version of each of the one or more long word-sequences, an associated substitute short word may be determined. By way of an example, for the long word-sequences "charging units," "charging stations," "charging devices," "charging apparatuses," "charging equipments," and "charging modules" the associated substitute short word determined is "chargers".

At step 606, each of the identified one or more long word-sequences may be replaced with the associated substitute short word-sequence in the patent document text to generate the patent document summary. By way of an example, the long word-sequences "control units," "control stations," "control devices," "control apparatuses," "control equipments," and "control modules" may be replaced with "controller." By way of another example, "computer program" may be replaced with "software," "software product" may be replaced with "software," and "computer processor" may be replaced with "CPU." By way of yet another example, "the present invention" may be replaced with "this invention" and "the present disclosure" with "this disclosure," and "at least one" with "one."

Additionally or alternatively, the method for creating a patent document summary from a patent document text may include replacing difficult (obscure) words with simple and more commonly known words. Firstly, one or more obscure words may be identified within a patent document text. It may be appreciated that an obscure word may be an uncommon word, the meaning for which may not be easily understood. In some embodiment, the one or more obscure word may be identified manually. By way of an example, the patent document text may include obscure words, such as "component," "stationary," "herein," and so on.

Once the one or more obscure words are identified, an associated substitute simple word for each of the one or more obscure word may be determined, based on a dictionary. By way of an example, the associated substitute simple word determined for the obscure word "component" may be "part", for "stationary" the simple word may be "fixed," and for "herein" the simple word may be "here." Further, for the plural version of an obscure word, the same associated substitute simple word may be determined as for the singular version of the obscure word.

Once an associated substitute simple word for each of the one or more obscure words is determined, each of the one or more obscure words may be replaced with the associated substitute simple word. By way of an example, the obscure words "component", "stationary", and "herein" may be replaced with associated substitute simple words "part", "fixed" and "here", respectively. Similarly, "describe", "described", "describes" and "describing" may be replaced with "discuss," "discussed," "discusses," and "discussing," respectively; "pertain" may be replaced with "relate;" and "transmit," "transmitted," and "transmitting" may be replaced with "send," "sent," and "sending," respectively.

Additionally or alternatively, the method for creating a patent document summary from a patent document text may include replacing long form of words with abbreviations. Long form of words that have abbreviated short forms may be identified within a patent document text based on an abbreviation dictionary. By way of an example, for the word "identifier," the abbreviated short form may be identified as "ID," for "power supply unit" as "PSU," and for "short message service" as "SMS." Once the one or more long form of words that have abbreviated short forms are identified, the one or more long form of words may be replaced with the associated abbreviated short forms. It will be appreciated that the methods disclosed in FIG. 6 may be used in conjunction with the method discussed in FIG. 3, FIG. 4, and FIGS. 5A and 5B.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
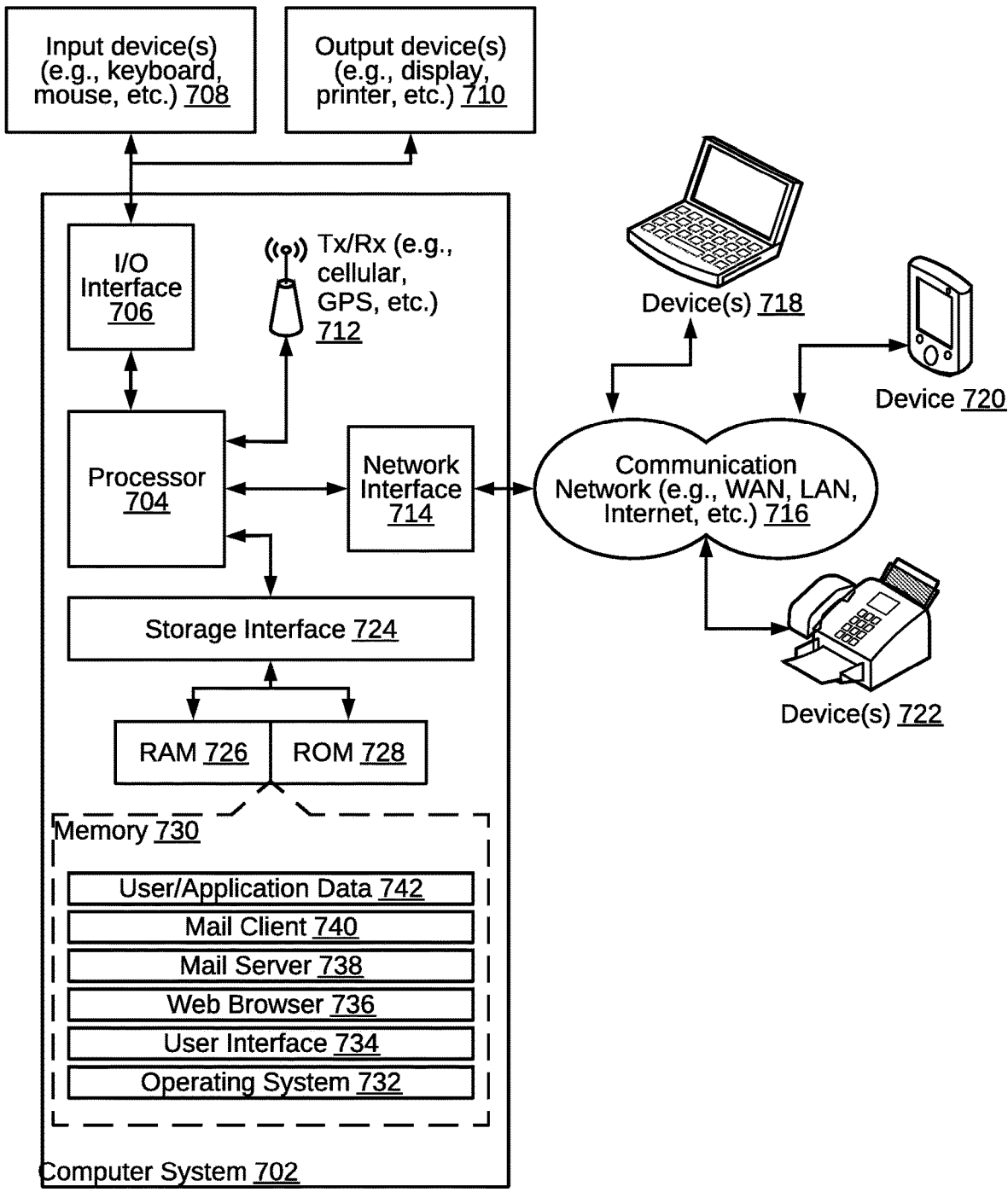
FIG. 7 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, a block diagram of an exemplary computer system 702 for implementing various embodiments is illustrated. Computer system 702 may include a central processing unit ("CPU" or "processor") 704. Processor 704 may include at least one data processor for executing program components for executing user or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 1004 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (for example, TEXAS® INSTRUMENTS WILINK WL1286® transceiver, BROADCOM® BCM45501UB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (for example, using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (for example, RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (for example, any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

As will be appreciated by those skilled in the art, the techniques described in the various embodiments discussed above pertain to creating a patent document summary from a patent document text. The techniques may generate the patent document summary by replacing certain word-sequences with substitute word-sequences so as to make the patent generated patent summary easily comprehendible by a user. For example, by replacing repeating word-sequences with relatively short word-sequences, the length of the patent document summary can be reduced with respect to the patent document text. In some cases, the length of the length of the patent document summary may be reduced by 30% with respect to the original patent document text. Further, the techniques by replacing different variants of word-sequences carrying same meaning by a single word-sequence, further enhance the consistency and, hence, comprehensibility of the patent document text. Further, the techniques by replacing obscure words with relatively simple words further enhance the comprehensibility, and avoid creating confusion to the users. Further, the techniques by replacing word-sequences by commonly known abbreviations make the patent document summary more concise and compact. Overall, by the disclosed techniques, the patent document text is simplified. Hence, process of analyzing the patent documents is made easy. As a result, the process of analyzing patent document is made more effort efficient, time efficient, and more accurate.

The specification has described method and system for creating a patent document summary from a patent document text. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for creating a patent document summary from a patent document text, the method comprising:
creating a data repository of stop-words based on analysis of a plurality of patent documents by a machine learning algorithm, wherein creating the data repository of stop-words comprises:
employing a machine learning model to analyze the plurality of patent documents to extract the stop-words,
wherein manually identified stop words are initially provided to the machine learning model,
wherein the plurality of patent documents act as collection of multiple data points utilized to train and develop the machine learning model based on the manually identified stop words, and
wherein the stop-words are identified in the plurality of patent documents by the machine learning model, to create the data repository of stop-words;
generating an array comprising a plurality of tuples from the patent document text based on the stop-words in the data repository, wherein the plurality of tuples are identified by removing one or more stop-words in the data repository from the patent document text;
identifying each of:
at least one word-sequence from the array, wherein each of the at least one word-sequence occurs at least twice within the patent document text, and wherein each of the at least one word-sequence comprises a unique last word;
at least one obscure word within the patent document; and
at least one unabbreviated word within the patent document;
replacing:
for each of the at least one word-sequence, second and subsequent occurrences of each of the at least one word-sequence within the patent document text with an associated substitute word-sequence, wherein the associated substitute word-sequence comprises at least one word;
each of the at least one obscure word with an associated simple word; and
each of the at least one unabbreviated word with an associated abbreviated form; and
generating, the patent document summary for the patent document text in response to the replacing.

2. The method of claim 1 further comprising displaying the patent document summary on a user interface, wherein each substitute word-sequence in the patent document summary comprises a highlighting attribute to indicate text replacement.

3. The method of claim 2, wherein the highlighting attribute comprises at least one of underline, italics, bold, color, or strikethrough.

4. The method of claim 2 further comprising receiving a predefined action through an external interface on a highlighting attribute of a substitute word-sequence associated with a word-sequence from the at least one word-sequence.

5. The method of claim 4, wherein the predefined actions comprises at least one of: clicking on the highlighting attribute, hovering a mouse pointer over the highlighting attribute, clicking on the highlighting attribute for a predefined duration through a mouse, or performing a right-click on the highlighting attribute.

6. The method of claim 4 further comprising displaying the word-sequence to a user in a display window, in response to the predefined actions.

7. The method of claim 6 further comprising:
providing a feedback element within the display window; and
receiving a feedback, through the feedback element from a user, for the substitute word-sequence.

8. The method of claim 7, wherein the feedback comprises one of: approval for the substitute word-sequence, disapproval for the substitute word-sequence, or alternative word-sequence suggestion in place of the substitute word-sequence.

9. The method of claim 1 further comprising:
identifying one or more long word-sequences within the array;
determining an associated substitute short word-sequence for each of the one or more long word-sequences based on a mapping dictionary; and
replacing each of the one or more long word-sequence with the associated substitute short word-sequence in the patent document text to generate the patent document summary.

10. A system for creating a patent document summary from a patent document text, the system comprising:
a processor; and
a memory communicatively coupled to the processor, wherein the memory stores processor instructions, which, on execution, causes the processor to:
create a data repository of stop-words based on analysis of a plurality of patent documents by a machine learning algorithm, wherein creating the data repository of stop-words comprises:
employing a machine learning model to analyze the plurality of patent documents to extract the stop-words,
wherein manually identified stop words are initially provided to the machine learning model,
wherein the plurality of patent documents act as collection of multiple data points utilized to train and develop the machine learning model based on the manually identified stop words, and
wherein the stop-words are identified in the plurality of patent documents by the machine learning model, to create the data repository of stop-words;
generate an array comprising a plurality of tuples from the patent document text based on the stop-words in the data repository, wherein the plurality of tuples are identified by removing one or more stop-words in the data repository from the patent document text;
identify each of:
at least one word-sequence from the array, wherein each of the at least one word-sequence occurs at least twice within the patent document text, and wherein each of the at least one word-sequence comprises a unique last word;
at least one obscure word within the patent document; and
at least one unabbreviated word within the patent document;
replace:
for each of the at least one word-sequence, second and subsequent occurrences of each of the at least one word-sequence within the patent document text with an associated substitute word-sequence, wherein the associated substitute word-sequence comprises at least one word;
each of the at least one obscure word with an associated simple word; and
each of the at least one unabbreviated word with an associated abbreviated form; and
generate, the patent document summary for the patent document text in response to the replacing.

11. The system of claim 10, wherein the processor instructions further cause the processor to display the patent document summary on a user interface, wherein each substitute word-sequence in the patent document summary comprises a highlighting attribute to indicate text replacement, and wherein the highlighting attribute comprises at least one of underline, italics, bold, color, or strikethrough.

12. The system of claim 11, wherein the processor instructions further cause the processor to receive a predefined action through an external interface on a highlighting attribute of a substitute word-sequence associated with a word-sequence from the at least one word-sequence.

13. The system of claim 12, wherein the predefined actions comprises at least one of: clicking on the highlighting attribute, hovering a mouse pointer over the highlighting attribute, clicking on the highlighting attribute for a predefined duration through a mouse, or performing a right-click on the highlighting attribute.

14. The system of claim 12, wherein the processor instructions further cause the processor to display the word-sequence to a user in a display window, in response to the predefined actions.

15. The system of claim 14, wherein the processor instructions further cause the processor to:
provide a feedback element within the display window; and
receive a feedback, through the feedback element from a user, for the substitute word-sequence.

16. The system of claim 15, wherein the feedback comprises one of: approval for the substitute word-sequence, disapproval for the substitute word-sequence, or alternative word-sequence suggestion in place of the substitute word-sequence.

17. The system of claim 10, wherein the processor instructions further cause the processor to:
identify one or more long word-sequences within the array;
determine an associated substitute short word-sequence for each of the one or more long word-sequences based on a mapping dictionary; and
replace each of the one or more long word-sequence with the associated substitute short word-sequence in the patent document text to generate the patent document summary.

18. A non-transitory computer-readable storage medium having stored thereon, a set of computer-executable instructions causing a computer comprising one or more processors to perform steps comprising:
creating a data repository of stop-words based on analysis of a plurality of patent documents by a machine learning algorithm, wherein creating the data repository of stop-words comprises:
employing a machine learning model to analyze the plurality of patent documents to extract the stop-words, wherein manually identified stop words are initially provided to the machine learning model, wherein the plurality of patent documents act as collection of multiple data points utilized to train and develop the machine learning model based on manually identified stop words, and wherein the stop-words are identified in the plurality of patent documents by the machine learning model, to create the data repository of stop-words;

generating an array comprising a plurality of tuples from the patent document text based on the stop-words in the data repository, wherein the plurality of tuples are identified by removing one or more stop-words in the data repository from the patent document text;

identifying each of:
- at least one word-sequence from the array, wherein each of the at least one word-sequence occurs at least twice within the patent document text, and wherein each of the at least one word-sequence comprises a unique last word;
- at least one obscure word within the patent document; and
- at least one unabbreviated word within the patent document;

replacing:
- for each of the at least one word-sequence, second and subsequent occurrences of each of the at least one word-sequence within the patent document text with an associated substitute word-sequence, wherein the associated substitute word-sequence comprises at least one word;
- each of the at least one obscure word with an associated simple word; and
- each of the at least one unabbreviated word with an associated abbreviated form; and generating, the patent document summary for the patent document text in response to the replacing.

* * * * *